UNITED STATES PATENT OFFICE.

GEORGE A. CASSELMAN, OF FORT DODGE, IOWA.

COMPOSITION OF MATTER FOR WHITING.

SPECIFICATION forming part of Letters Patent No. 454,152, dated June 16, 1891.

Application filed February 21, 1891. Serial No. 382,300. (No specimens.)

*To all whom it may concern:*

Be it known that I, GEORGE A. CASSELMAN, of the city of Fort Dodge, county of Webster, and State of Iowa, have invented a new, useful, and Improved Composition of Matter for Whiting, of which the following is a specification.

My composition or compound consists of the following ingredients, combined in the proportions stated, viz: I take of ground gypsum rock two thousand pounds, of tartaric acid about twenty pounds, of sulphate of zinc about ten pounds; mix together and subject the mixture to a strong heat until thoroughly cooked or calcined, then cool and add sufficient water to make the mixture of the consistency of a thick paste. It is then run through a press or other machine, molding the mixture into form similar to that of a common brick. It is then again subjected to a strong heat or kiln and dried and then ground very fine, and in that condition is ready for use for mechanical or other purposes and as whiting.

The use of tartaric acid is for the purpose of bleaching or whitening the ground gypsum and rendering it softer and more flaky after it is cooked or calcined.

The sulphate of zinc is used for the purpose of counteracting or killing the effect of the sulphuric acid in the ground gypsum rock.

Having thus described my invention, what I claim as my invention, and desire to secure by Letters Patent, is—

The herein-described composition or compound to be used as a whiting for all mechanical and other purposes for which whiting is now used, &c., consisting of ground gypsum rock, tartaric acid, and sulphate of zinc mixed with water in about the proportions named, herein described, and ground to a fine powder.

GEORGE A. CASSELMAN.

Witnesses:
EMMA THROW,
C. E. COLWELL.